(12) United States Patent
May et al.

(10) Patent No.: US 10,634,450 B1
(45) Date of Patent: Apr. 28, 2020

(54) FIREARM STABLIZING CLIP

(71) Applicants: Luke May, Bellingham, WA (US); Brad Hibler, Cummin, GA (US)

(72) Inventors: Luke May, Bellingham, WA (US); Brad Hibler, Cummin, GA (US)

(*) Notice: Subject to any disclaimer, the term of this patent is extended or adjusted under 35 U.S.C. 154(b) by 9 days.

(21) Appl. No.: 15/939,624

(22) Filed: Mar. 29, 2018

(51) Int. Cl.
*F41C 33/00* (2006.01)
*F16B 2/10* (2006.01)

(52) U.S. Cl.
CPC .......... *F41C 33/001* (2013.01); *F41C 33/003* (2013.01); *F16B 2/10* (2013.01); *F41C 33/007* (2013.01)

(58) Field of Classification Search
CPC .... F41C 33/001; F41C 33/003; F41C 33/007; F16B 2/10; A47C 7/006; D06F 55/00; D06F 55/02; B25B 5/04
USPC ... 248/229.13, 229.23, 230.4, 231.51, 316.5; 42/94; 24/499, 509
See application file for complete search history.

(56) References Cited

U.S. PATENT DOCUMENTS

| | | | |
|---|---|---|---|
| 2,988,311 A * | 6/1961 | Bow | A01K 97/10 248/514 |
| 8,215,045 B2 | 7/2012 | Mitchell | |
| 8,544,153 B2 | 10/2013 | Mayberry et al. | |
| 8,640,932 B2 | 2/2014 | Dalton et al. | |
| 8,910,410 B2 | 12/2014 | Peters | |
| 9,297,610 B2 | 3/2016 | Borkowski et al. | |
| 9,726,450 B2 | 8/2017 | Borkowski et al. | |
| 2017/0156547 A1* | 6/2017 | Neumann | A47J 45/02 |

* cited by examiner

*Primary Examiner* — Christopher Garft
(74) *Attorney, Agent, or Firm* — Goldstein Law Offices, P.C.

(57) ABSTRACT

A firearm stabilizing clip, for use with a firearm having a rear portion and body armor having a front vertical edge. The clip includes a main part having an upper jaw, a lower jaw, and a hinge between the upper jaw and lower jaw. The upper jaw and lower jaw each have a proximal end. A pair of lever rails are selectively attachable to the proximal ends of the upper jaw and lower jaw to open the main part. A stabilizing fin extends from the upper jaw and includes a broad contact surface. Once the main part is secured over the front vertical edge of the body armor, the rear portion of the firearm can rest against the broad contact surface to steady the firearm.

10 Claims, 7 Drawing Sheets

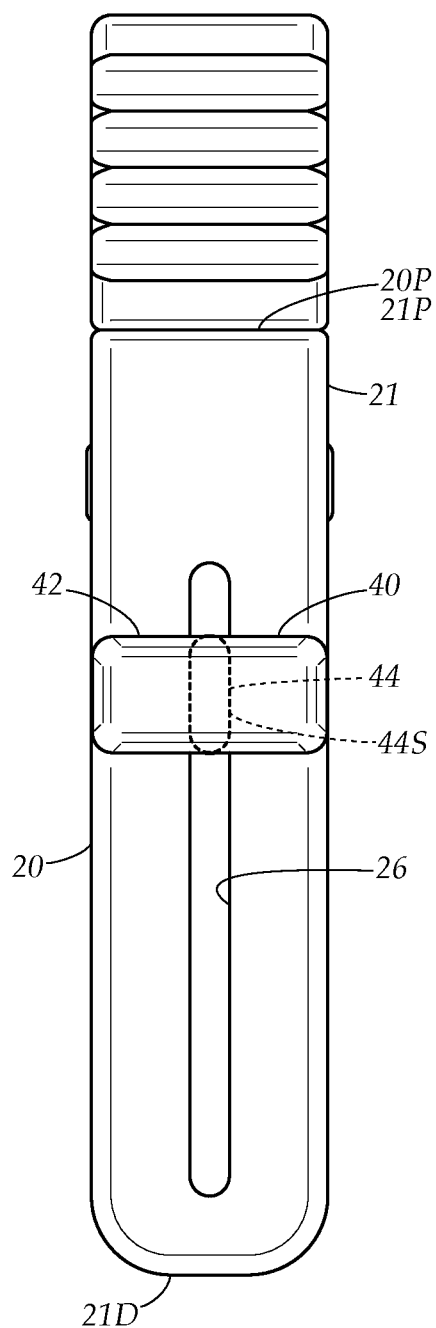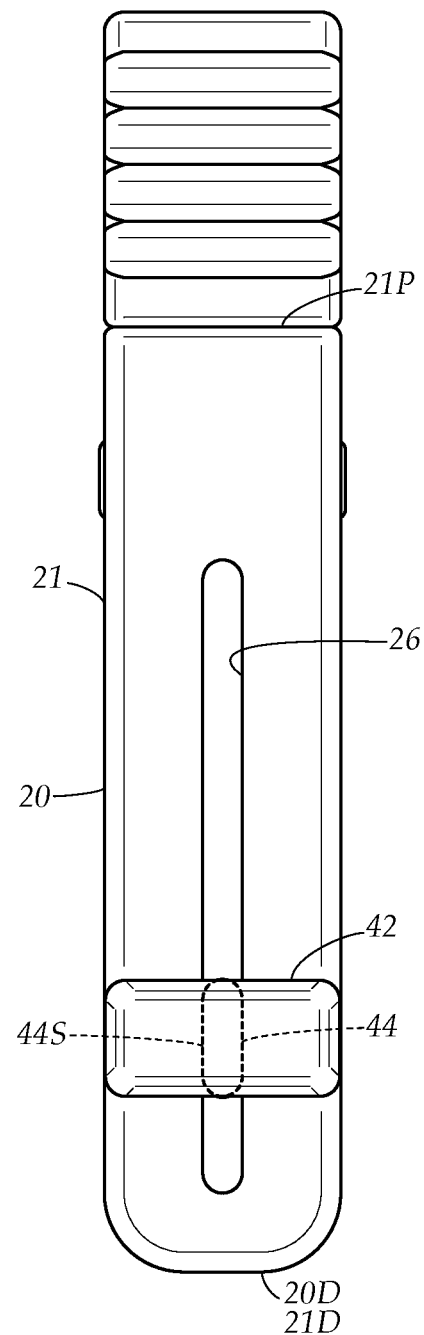
FIG. 4B
FIG. 4C

FIREARM STABLIZING CLIP

TECHNICAL FIELD

The present disclosure relates generally to a firearm stabilizing clip. More particularly, the present disclosure relates to a device that attaches onto body armor such as a bullet-proof vest or the like, for aiding the user in maintaining the position of a firearm both as it is being held in a ready position and as it is being fired.

BACKGROUND

Military and law enforcement personnel today routinely employ body armor in the course of law enforcement and military operations. Improvements in modern body armor technology have resulted in great increases in the protection offered without the drawback of prohibitive weight. Furthermore, while body armor has traditionally been most frequently utilized by military personnel, the rise of heavily armed criminal and terrorist threats have led to the increased use of substantial body armor by police and other law enforcement personnel.

Body armor, such as a bulletproof vest, is designed to protect the torso of the user, and the protective armor layers of the body armor often extend over the shoulders of the user and may cover the user's armpits. Body armor is often thick and bulky, especially with the addition of rigid ballistic plates for increased protection. One potentially serious disadvantage caused by the presence of bulky or thick armor around the shoulders and armpits of the user, is that the armor often prevents the user from being able to firmly position the stock or rear portion of a shotgun, rifle, or other firearm against the user's shoulder. If the user is unable to firmly position the firearm against his shoulder, the recoil of the firearm may cause the firearm to slide out of position when fired, spoiling the user's aim and preventing the user from effectively using the firearm. Furthermore, the lack of a stable surface against which the user can secure his firearm also prevents the user from achieving a consistent sight picture while aiming, greatly decreasing the user's accuracy even on the first shot. When faced with life or death situations where a difference of a split second may have devastating consequences, even a modest decrease in the user's ability to use his weapon is a severe disadvantage.

Various devices exist within the prior art which attempt to address the difficulty in shouldering, aiming, and firing a firearm while wearing thick or bulky body armor. Such devices often take the form of a rigid plate or socket affixed to the user's shoulder which is shaped to catch and retain the stock of the firearm. While such devices do address the problem of the firearm slipping against body armor to a certain extent, they are inflexible and cannot be repositioned and adjusted to suit the individual user's preferences and shooting habits. Furthermore, military and law enforcement personnel often face changing tactical situations that may require the use of various types of firearms having different shooting characteristics and requirements. Rigidly fixed devices critically do not allow the user to reposition and adjust the device to adapt to changing situations and different firearms. Furthermore, as many military and law enforcement personnel operate in wooded or cramped environments, it is vital that such devices do not further restrict the user's movements or present protrusions which may snag on foliage, clothing, and other obstacles.

Therefore, there is an urgent need for a stabilizing device which addresses the difficulties inherent in shouldering, aiming, and firing a firearm while wearing thick or bulky body armor, which is further adjustable and removable to allow the user to optimally position the device to suit the user's needs, and to quickly adapt to different situations.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a device that aids a user in effectively stabilizing a firearm in the ready position and as it is being fired. Accordingly, the present disclosure describes a stabilizing device that provides a stabilizing fin in the proximity of the user's shoulder, against which the butt of the firearm can be steadied, so that the firearm will remain in position both before, during, and after the firearm is fired.

It is another aspect of an example embodiment in the present disclosure to provide a device that readily attaches to existing body armor and allows the stabilizing fin to be positioned according to the preference and habits of the user. Accordingly, the stabilizing device is provided in the form of a clip that can selectively attach onto a side edge of the body armor and position the fin in a location where it protrudes forwardly from the body armor and thereby provides a stable position for readying the firearm.

It is yet another aspect of an example embodiment in the present disclosure to allow the clip to be repositioned when desired but will securely maintain its position during use. Accordingly, a hinge mechanism is provided that has a closed position and an open position. The hinge mechanism resists opening of the clip under normal conditions of use. Lever rails are provided, that selectively attach to the clip to provide sufficient leverage for opening, removing, and repositioning the clip, and selectively detach so that the hinge mechanism will remain in the closed position and hold the clip securely in place.

It is an aspect of an example embodiment in the present disclosure to accommodate different user preferences in lateral position of the stabilizing fin. Accordingly, an adjustment mechanism is provided so that the stabilizing fin is adjustable with respect to the clip.

Accordingly, the present disclosure describes a firearm stabilizing clip, for use with a firearm having a rear portion and body armor having a front vertical edge. The clip includes a main part having an upper jaw, a lower jaw, and a hinge between the upper jaw and lower jaw. The upper jaw and lower jaw each have a proximal end. A pair of lever rails are selectively attachable to the proximal ends of the upper jaw and lower jaw to open the main part. A stabilizing fin extends from the upper jaw and includes a broad contact surface. Once the main part is secured over the front vertical edge of the body armor, the rear portion of the firearm can rest against the broad contact surface to steady the firearm.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 4B is a top plan view, illustrating the stabilizing fin in a proximal position.

FIG. 4C is a top plan view, illustrating the stabilizing fin in a distal position.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
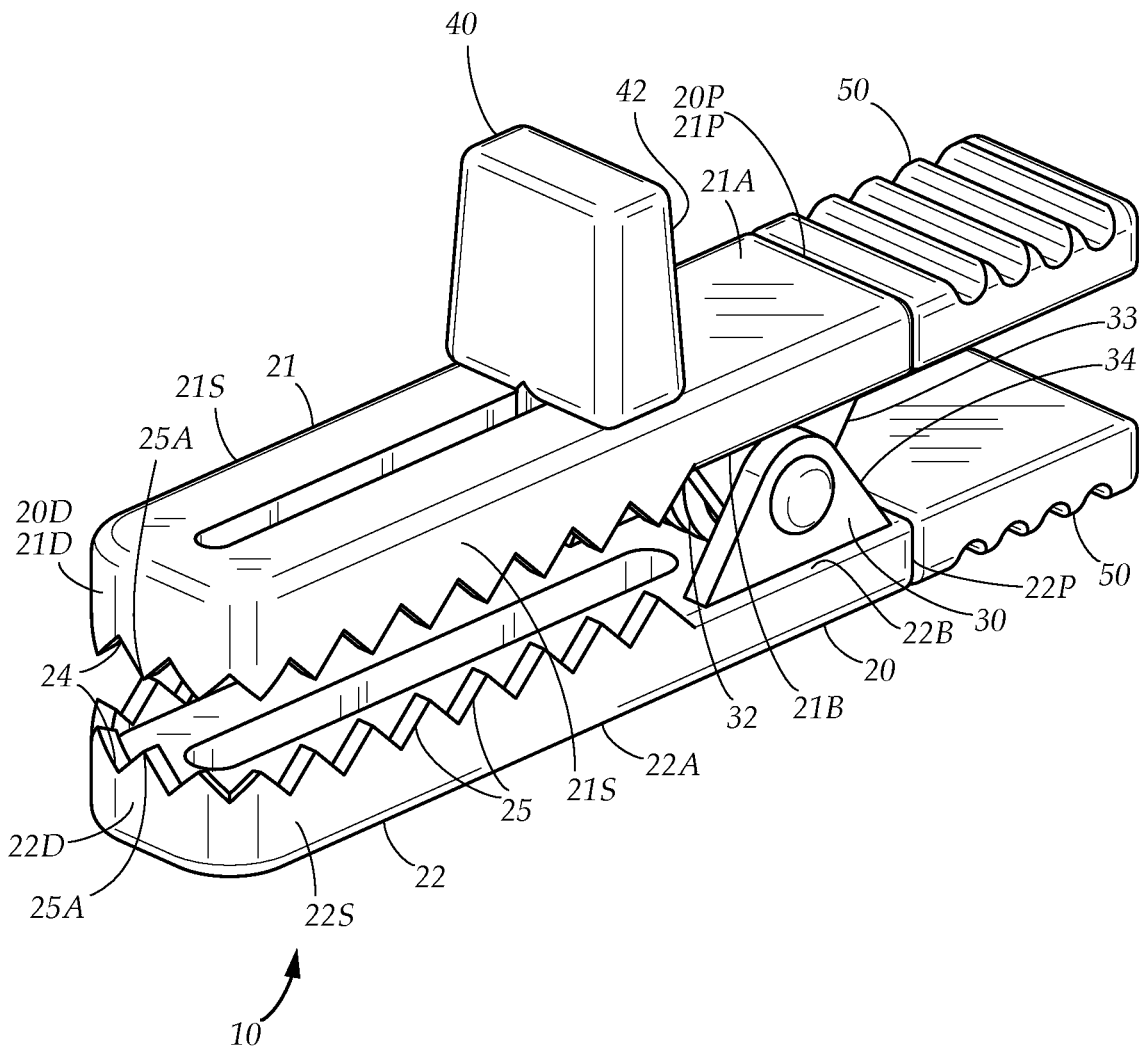
FIG. 1 is a diagrammatic perspective view, illustrating the stabilizing clip in accordance with an embodiment of the present disclosure.

FIG. 1 illustrates a firearm stabilizing clip 10, having a main part 20, a stabilizing fin 40, and a pair of lever rails 50. The main part 20 has a proximal end 20P, a distal end 20D, an upper jaw 21, and a lower jaw 22. The upper jaw 21 and lower jaw 22, each have a proximal end 21P, 22P, and a distal end 21D, 22D. A hinge spring 30 connects the upper jaw 21 and lower jaw 22 near their proximal ends 21P, 22P. The main part 20 has an open position where the distal ends 21D, 22D are further apart from each other than the proximal ends 21P, 22P, and a closed position where the upper jaw 21 and lower jaw 22 are substantially parallel to each other and perhaps the distal ends 21D, 22D are the same distance or slightly closer to each other than the proximal ends 21P, 22P of the upper jaw 21 and lower jaw 22. The hinge spring 30 biases the main part 20 toward the closed position, wherein the upper jaw 21 and lower jaw 22 extend substantially parallel to each other and even slightly inwardly toward each other at the distal ends 21D, 22D. The hinge spring 30 provides a strong biasing force that maintains the main part 20 in the closed position and is strong enough that a user would have insufficient leverage to overcome said biasing force by simply pinching the main part 20 at the proximal ends 21P, 22P between a thumb and forefinger.

In the embodiment shown, the hinge spring 30 is illustrated by example as including a torsion spring 32 that is connected between the proximal ends 21P, 22P of the upper jaw 21 and lower jaw 22 by upper brackets 33 and lower brackets 34. Other types of springs, however, can be used in place of the torsion spring 32, including compression springs, expansion springs, and flat springs. For example, in order to provide a substantially open space between the upper jaw 21 and lower jaw 22 fully between the proximal ends 21P, 22P, and distal ends 21D, 22D, a flat spring, extending substantially perpendicular to the upper jaw 21 and lower jaw 22, may be used to connect the upper jaw 21 and lower jaw 22 at the distal ends 21D, 22D.

The upper jaw 21 and lower jaw 22 each have a pair of side surfaces 21S, 22S, an outer surface 21A, 22A that face away from each other, and an inner surface 21B, 22B that face toward each other. The upper jaw 21 and lower jaw 22 each have an engaging surface 24 that is coextensive with the sides 21S, 22S near the inner surfaces 21B, 22B, and includes a plurality of teeth 25, with points 25A. The teeth 25 extend beyond the inner surfaces 21B, 22B and toward each other. The points 25A of the teeth 25 of the upper jaw 21 face the points 25A of the teeth 25 of the lower jaw 22.

The stabilizing fin 40 is attached to the upper jaw 21 and extends perpendicularly upwardly therefrom. The stabilizing fin 40 has a broad contact surface 42 that extends perpendicular to the outer surface 21A of the upper jaw 21. The broad contact surface 42 is sufficiently sized so as to provide a stable surface against which to rest a rear portion of a firearm. The broad contact surface 42 is generally as wide as the upper jaw 21 as defined between the sides 21S of the upper jaw 21, and has a lateral thickness as necessary to provide sufficient strength and rigidity considering its use as described hereinafter.

Referring momentarily to FIG. 4B and FIG. 4C, the upper jaw 21 has an adjustment slot 26 extending therethrough, partially between the proximal end 21P and distal end 21D thereof. The stabilizing fin 40 has a tab 44 that extends snugly within the adjustment slot 26, can slide laterally therealong to reposition the broad contact surface 42. The tab 44 is elongated with flat side surfaces 44S that interact with the adjustment slot 26 to allow the tab 44 and the stabilizing fin 40 to move laterally within the slot, while preventing the tab 44 and stabilizing fin 40 from rotating. As indicated, the stabilizing fin can be positioned and secured in various desirable positions, including a position where it is close to the proximal end 20P of the main part 20 as shown in FIG. 4B, and a position where it is close to the distal end 20D of the main part 20 as shown in FIG. 4C. Note that the stabilizing fin can be infinitely adjustable between such extremes, or can have two, four, or a desirable number of preset positions where the stabilizing fin 40 can be located and secured in a manner described hereinbelow.

Figure 2:
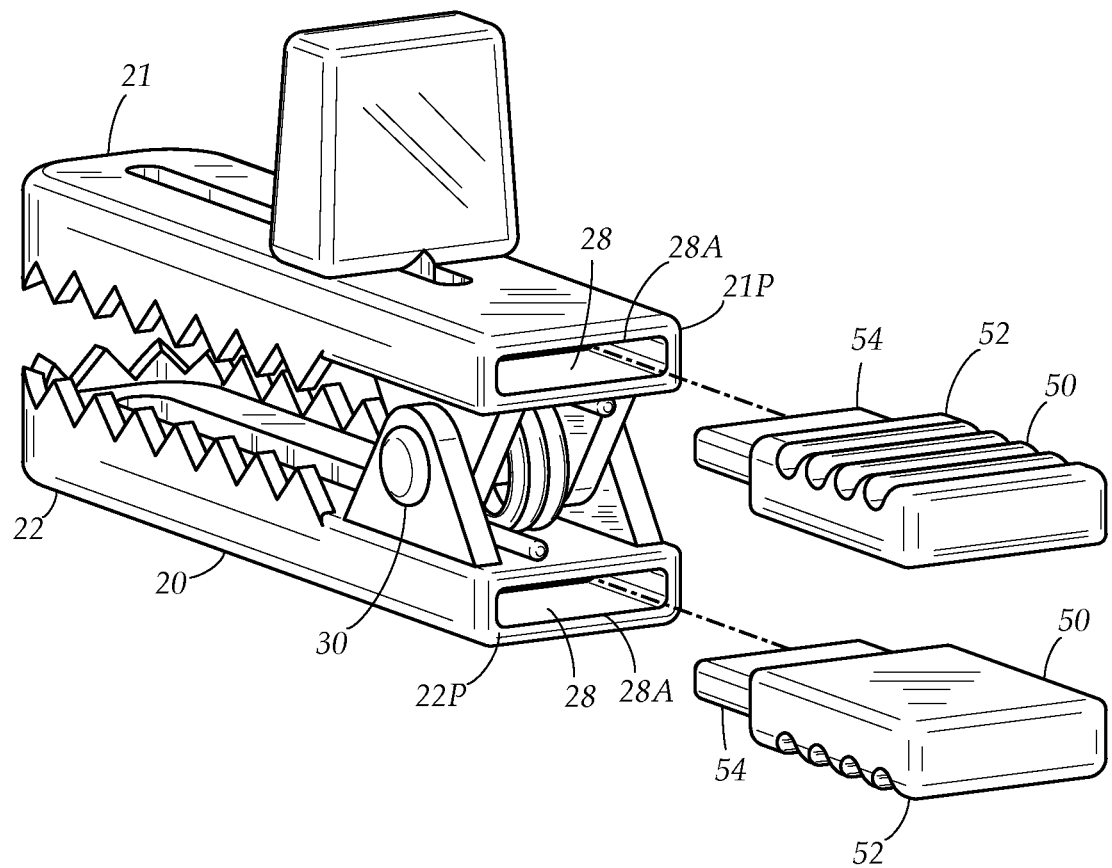
FIG. 2 is an exploded view, illustrating the selective interconnection of the lever rails with the main part of the stabilizing clip.

Referring now to FIG. 2, the lever rails 50 are shown removed from the main part 20. With the lever rails 50 so removed, the main part 20 will remain in its closed position under ordinary operating conditions and even if the user attempts to manually open it. The lever rails 50 may be selectively attached and connected to the proximal ends 21P, 22P of the upper jaw 21 and lower jaw 22 to provide sufficient leverage to overcome the biasing force of the spring 30. In particular, referring to FIG. 3A, the lever rails 50 are attached to the main part 20 which is presently in the closed position. Then, referring to FIG. 3B, a user 100, having a thumb 102, and forefinger 104 is grasping the clip 10, wherein the forefinger 104 of the user 100 is pushing against the one of the lever rails 50 that is attached to the upper jaw 21, and the thumb 102 of the user 100 is pushing against the one of the lever rails 50 that is attached to the lower jaw 22. Bringing the main part 20 to the open position thereby involves pushing/pinching the lever rails 50 toward each other. Together, the thumb 102 and forefinger 104 have sufficient leverage to overcome the bias force of the spring 30 and move the main part 20 into the open position.

In the example illustrated in FIG. 2, the main part 20 has end sockets 28 that extend laterally into the proximal ends 21P, 22P of the upper jaw 21 and lower jaw 22 that each include a substantially rectangular socket opening 28A thereat. The lever rails 50 may each include a grip pad 52 and a plug 54. The plugs 54 are substantially rectangular in shape, or otherwise sized and shaped to fit snugly into the end sockets 28. Note that this plug and socket arrangement can be reversed, with a different configuration for the spring 30 than shown, wherein the lever rails 50 are configured to extend over the proximal ends 21P, 22P like a sleeve.

Figure 3A:
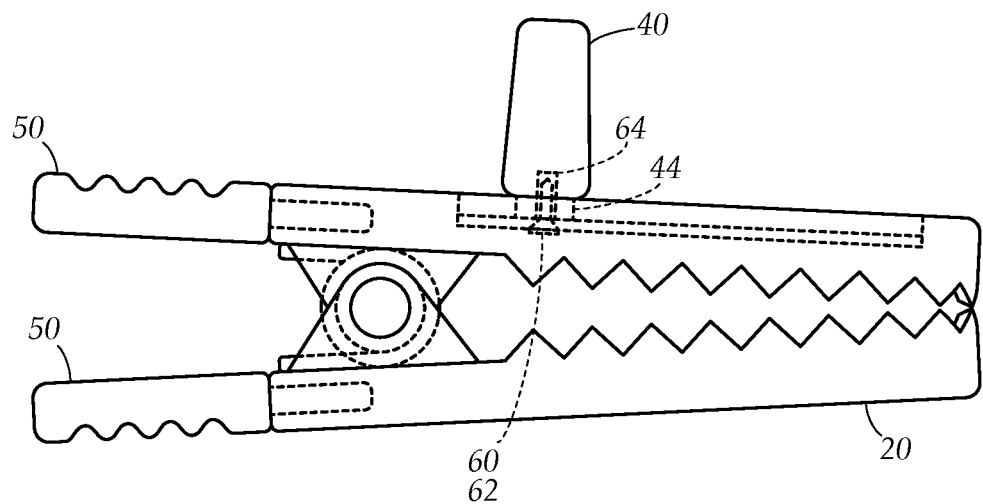
FIG. 3A is a side elevational view, illustrating the clip with the lever rails attached and shown in the closed position, with aspects of an adjustment mechanism shown in phantom.
Figure 3B:
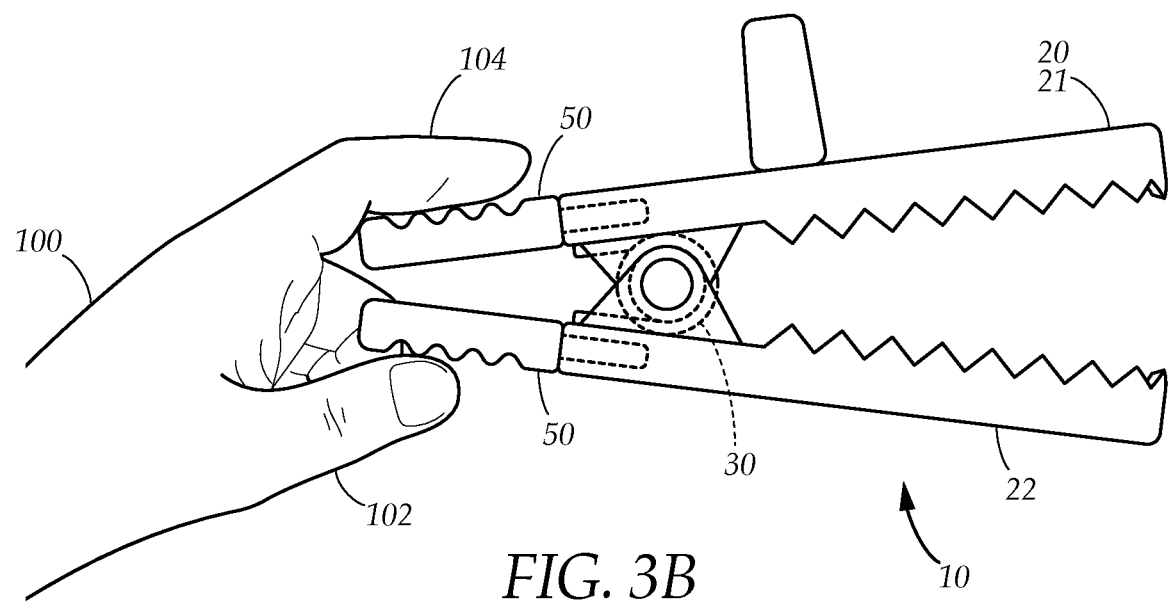
FIG. 3B is a side elevational view, similar to FIG. 3A, except wherein the clip is shown in an open position.
Figure 4A:
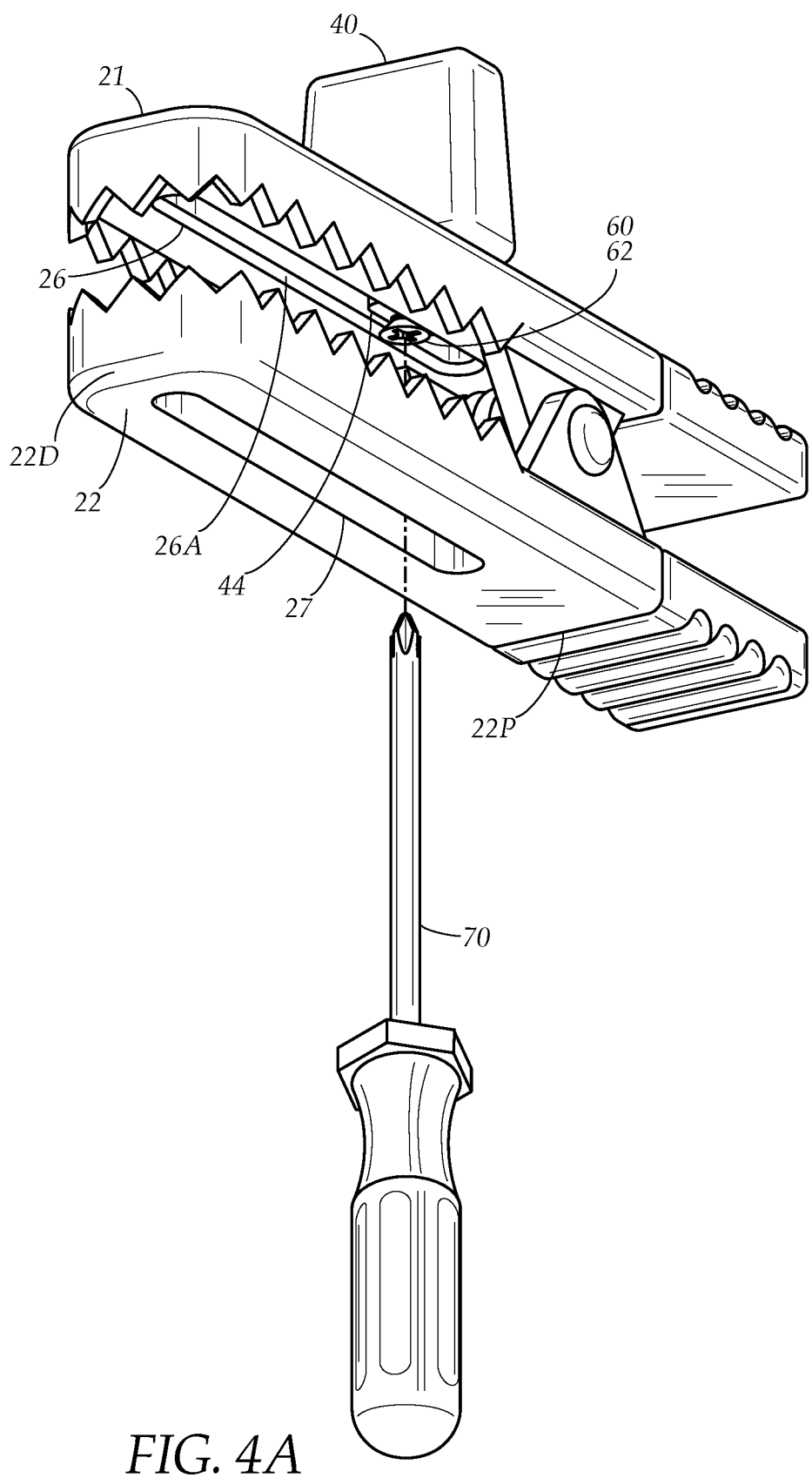
FIG. 4A is a diagrammatic perspective view, wherein a user is adjusting the position of the stabilizing fin using the adjustment mechanism.

FIG. 4A illustrates an adjustment mechanism 60 employed for fixing the lateral position of the stabilizing fin 40 with respect to the upper jaw 21. In particular, the adjustment mechanism 60 may include a fixing part 62 that may be selectively loosened to allow lateral adjustment of the stabilizing fin 40, and selectively tightened to securely maintain the stabilizing fin 40 in position. As illustrated in FIG. 4A, the fixing part 62 may be a screw, and the adjustment slot 26 may have a beveled lower surface 26A, such that the screw is tightened against the beveled lower surface 26A to hold the tab 44 in place. Also in FIG. 4A, the lower jaw 22 has an access slot 27 that extends fully therethrough and partially between the proximal 22P and distal end 22D thereof. The access slot 27 is wide enough to allow a tool, such as a screwdriver shank 70 to extend therethrough and reach the fixing part 62 when necessary to loosen or tighten the same. Referring to FIG. 3A, the adjustment mechanism 60 includes a fixing channel 64 that extends upwardly into the tab 44 to seat the fixing part 62. The fixing channel 64 may be threaded to facilitate loosening and tightening of the fixing part 62. Note that various mechanisms can be employed to fix the position of the stabilizing fin 40, including threaded, and non-threaded solutions, spring-loaded equivalents to the fixing part 62, and those that have preset positions and appropriate structural adaptations to provide such preset positions.

Figure 5:
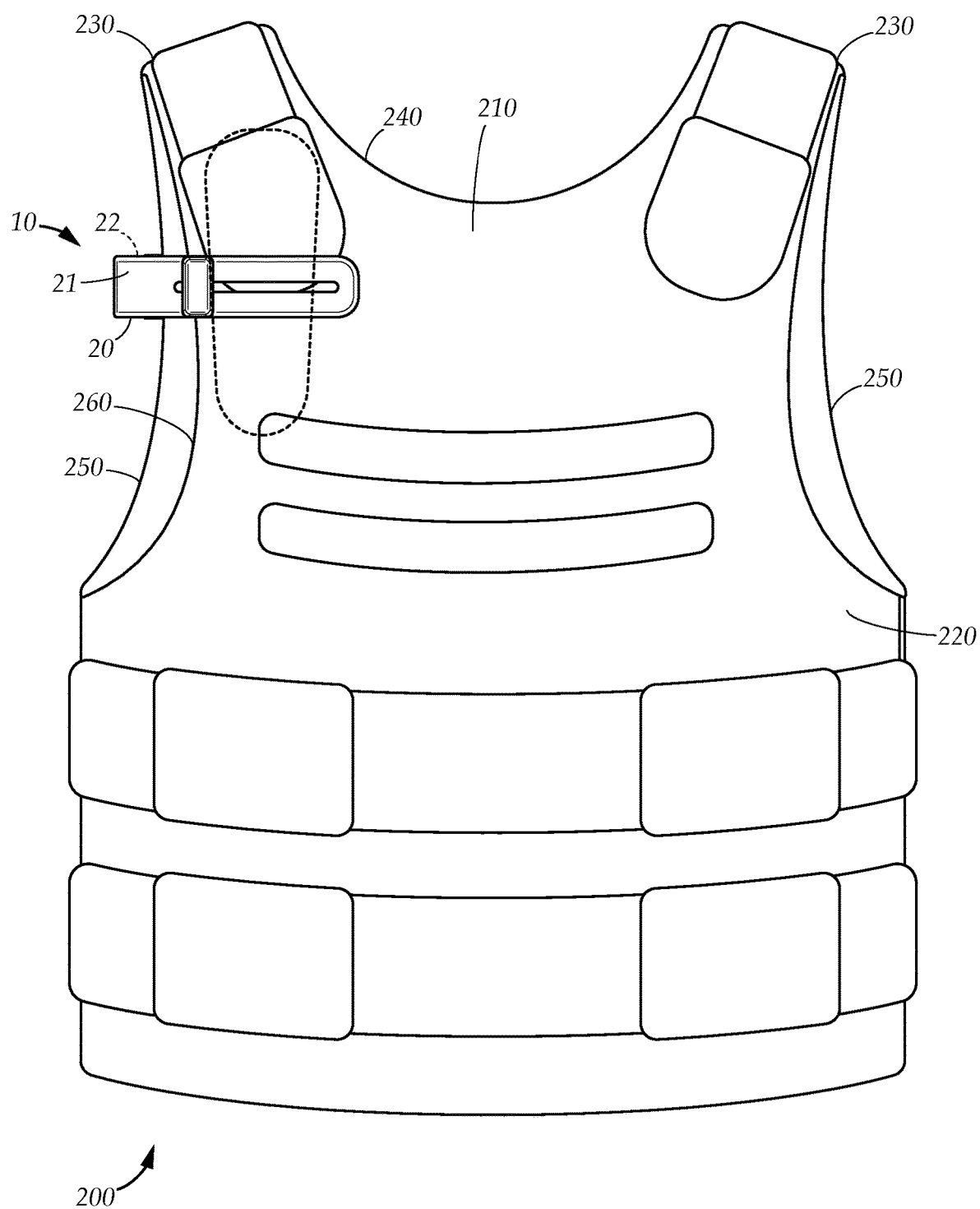
FIG. 5 is a front elevational view, illustrating the stabilizing clip in use, attached onto body armor.

Referring now to FIG. 5, the clip 10 is shown in conjunction with an item of body armor 200. The body armor has a chest portion 210, a lower portion 220, and a pair of shoulder straps 230 that together with the chest portion 210 and lower portion 220 define a neck opening 240 and a pair of arm pit openings 250. The arm pit openings 250 are partially defined by a front vertical edge 260 that is adjacent to the chest portion 210. In accordance with the principles of the present disclosure, the clip 10 is attached to the chest portion 210 along the front vertical edge 260. In particular, the upper jaw 21 is extending horizontally onto and in front of the chest portion, while the lower jaw 22 (better seen in FIG. 6) is extending horizontally behind the chest portion 210. Note that the lever rails 50 are not shown, as they are not attached to the main part 20. In addition, while the clip 10 protrudes slightly beyond the chest in the example shown to be consistent with the example provided in the other drawing figures, other configurations of the hinge (not shown) as discussed earlier would allow the clip to be inserted further into the chest portion 210 and thereby protrude less beyond the front vertical edge 260.

Figure 6:
FIG. 6 is a diagrammatic perspective view, illustrating the stabilizing clip in use, wherein the user is steadying a rear portion of a firearm against the stabilizing fin as he positions and aims the firearm.

In FIG. 6, the user 100 is holding a firearm 300. The firearm has a rear portion 302, including a rear side edge 304. Note that the rear portion 302 can be the butt of the firearm, or any other component that would ordinarily be steadied against the chest/shoulder region when it is being prepared to be fired. In accordance with the principles of the present disclosure, the rear portion 302 of the firearm—namely the rear side edge 304—is resting against the stabilizing fin 40. Referring momentarily to FIG. 5, the rear portion 302 of the firearm is shown in phantom, with the rear side edge 304 positioned as it would be, resting against the broad contact surface 42. Referring again to FIG. 6, the user 100 can effectively anchor the position of the firearm 300 as it is being readied, when it is aimed, and while it is being fired. After the firearm is discharged, the firearm will remain in the same position, still steadied against the stabilizing fin 40. The clip 10 will remain in position, due to the strong biasing force of the spring 30, even as the firearm is repeatedly fired. Should the user 100 wish to relocate or remove the clip 10, the lever rails 50 (not shown) would be engaged with the main part 20 to provide leverage for opening the main part 20.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a firearm stabilizing clip. The disclosure is illustrated by example in the drawing figures, and throughout the written description. It should be understood that numerous variations are possible, while adhering to the inventive concept. Such variations are contemplated as being a part of the present disclosure.

What is claimed is:

1. A firearm stabilizing clip, for use by a user in stabilizing a firearm having a rear portion having a rear side edge, the firearm stabilizing clip is further adapted to be attached to body armor worn by the user, the stabilizing clip comprising:
   a stabilizing fin, having a tab and a broad contact surface adapted for supporting the rear side edge of the firearm;
   a main part having an upper jaw having a proximal end and a distal end, a lower jaw having a proximal end and a distal end, and a hinge located near the distal end so that the main part has an open position wherein said proximal ends approach each other and increase a distance between the distal ends, and a closed position wherein the proximal ends separate and decrease the distance between the distal ends, the distal ends of the upper and lower jaws are adapted to grip the body armor when the main part is in the closed position, the upper jaw and lower jaw each having inner surfaces that face each other, sides, and an engaging surface along the sides and distal ends that have teeth that face each other, the upper jaw has an adjustment slot extending partially between the proximal and distal ends of said upper jaw, the tab of the stabilizing fin extends into the adjustment slot, the upper jaw also having an outer surface opposite from its inner surface, the stabilizing fin extends upwardly from the outer surface of the upper jaw such that the broad contact surface extends perpendicular to said outer surface;
   an adjustment mechanism for fixing a position of the tab within the adjustment slot and the stabilizing fin with respect to the upper jaw; and
   a pair of lever rails that are selectively attachable to the proximal ends of the upper jaw and lower jaw to provide leverage to overcome the hinge and open the main part.

2. The firearm stabilizing clip as described in claim 1, wherein the tab is oblong and has flat side surfaces that interact with the adjustment slot to allow the tab to slide along the adjustment slot while preventing the tab and stabilizing fin from rotating.

3. The firearm stabilizing clip as described in claim 2, wherein the upper jaw and lower jaw each have an end socket at the proximal end, wherein the lever rails include grip pad and a plug, and wherein the plug of each level rail is selectively inserted into the socket opening of one of the upper jaw and lower jaw to selectively attach the lever rails to the main part.

4. The firearm stabilizing clip as described in claim 3, wherein the end sockets each have a generally rectangular socket opening, and wherein the plugs are generally rectangular in shape.

5. The firearm stabilizing clip as described in claim 4, wherein the adjustment mechanism includes a fixing part for securing the tab to the upper jaw at the inner surface of the upper jaw, and wherein the lower jaw further comprises an access slot adapted for allowing a tool to extend through the lower jaw to reach the fixing part.

6. A firearm stabilizing clip, for use by a user in stabilizing a firearm having a rear portion having a rear side edge, the firearm stabilizing clip is further adapted to be attached to body armor worn by the user, the stabilizing clip comprising:
   a main part having an upper jaw having a proximal end and a distal end, a lower jaw having a proximal end and a distal end, and a hinge located near the distal end so that the main part has an open position wherein said distal ends are further apart than said proximal ends, and a closed position wherein said distal ends are closer together than said proximal ends, the distal ends of the upper and lower jaws are adapted to grip the body armor when the main part is in the closed position, the upper jaw and lower jaw each having inner surfaces that face each other, sides, a width between the sides, and an engaging surface along the sides and distal ends that have teeth that face each other, the upper jaw also having an outer surface opposite from its inner surface, the upper jaw has an adjustment slot extending partially between the proximal and distal ends of said upper jaw;
   a stabilizing fin that extends upwardly from the outer surface of the upper jaw and a tab that extends into the adjustment slot, the stabilizing fin having a broad contact surface that extends perpendicular to the outer surface of the upper jaw, the broad contact surface has a width that is substantially the same as the width of the upper jaw, adapted for supporting the rear side edge of the firearm;
   an adjustment mechanism for fixing a position of the tab within the adjustment slot and the stabilizing fin with respect to the upper jaw; and
   a pair of lever rails that are selectively attachable to the proximal ends of the upper jaw and lower jaw to provide leverage to overcome the hinge and open the main part.

7. The firearm stabilizing clip as described in claim 6, wherein the upper jaw and lower jaw each have an end socket at the proximal end, wherein the lever rails include grip pad and a plug, and wherein the plug of each level rail is adapted to be inserted into the socket opening of one of the upper jaw and lower jaw to selectively attach the lever rails to the main part.

8. The firearm stabilizing clip as described in claim 7, wherein the end sockets each have a generally rectangular socket opening, and wherein the plugs are generally rectangular in shape.

9. The firearm stabilizing clip as described in claim 8, wherein the tab is oblong and has flat side surfaces that interact with the adjustment slot to allow the tab to slide along the adjustment slot while preventing the tab and stabilizing fin from rotating.

10. The firearm stabilizing clip as described in claim 9, wherein the adjustment mechanism includes a fixing part for securing the tab to the upper jaw at the inner surface of the upper jaw, and wherein the lower jaw further comprises an access slot adapted for allowing a tool to extend through the lower jaw to reach the fixing part.

\* \* \* \* \*